US008151780B2

United States Patent
Douzono et al.

(10) Patent No.: US 8,151,780 B2
(45) Date of Patent: Apr. 10, 2012

(54) CONTROL METHOD AND SYSTEM FOR DUAL-FUEL ENGINE

(75) Inventors: Kazuho Douzono, Higashihiroshima (JP); Takafumi Teramoto, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 495 days.

(21) Appl. No.: 12/488,261

(22) Filed: Jun. 19, 2009

(65) Prior Publication Data

US 2010/0000501 A1 Jan. 7, 2010

(30) Foreign Application Priority Data

Jul. 2, 2008 (JP) .................................. 2008-173441

(51) Int. Cl.
*F01P 7/16* (2006.01)
(52) U.S. Cl. ........ 123/578; 123/525; 123/575; 123/518; 123/520; 123/544; 123/1 A; 123/3
(58) Field of Classification Search .................. 123/544, 123/522, 510, 516, 518, 525, 1 A, 3, 575–578
See application file for complete search history.

(56) References Cited

U.S. PATENT DOCUMENTS

| | | | | |
|---|---|---|---|---|
| 3,688,755 A * | 9/1972 | Grayson et al. | ............... | 123/549 |
| 3,788,283 A * | 1/1974 | Perry | ................................. | 123/3 |
| 5,357,908 A * | 10/1994 | Sung et al. | ......................... | 123/3 |
| 6,105,561 A * | 8/2000 | Ferrera et al. | .................. | 123/575 |
| 6,227,151 B1 * | 5/2001 | Ma | ..................................... | 123/3 |
| 6,371,094 B1 * | 4/2002 | Wagner | ......................... | 123/576 |

FOREIGN PATENT DOCUMENTS

| | | |
|---|---|---|
| DE | 10 2006 051 914 | 5/2008 |
| JP | 2005-220802 | 8/2005 |
| JP | 2007162632 | 6/2007 |
| JP | 2008088864 | 4/2008 |

OTHER PUBLICATIONS

ISA European Patent Office, Search Report of EP 09 00 8213, Nov. 2, 2009, Netherlands, 5 pages.

* cited by examiner

*Primary Examiner* — Noah Kamen
*Assistant Examiner* — Hung Q Nguyen
(74) *Attorney, Agent, or Firm* — Alleman Hall McCoy Russell & Tuttle LLP

(57) ABSTRACT

Various systems and methods are described for controlling a dual-fuel engine that has an evaporated gas providing device for providing an evaporated gas into the engine and is operable with hydrocarbon fuel or non-hydrocarbon fuel, alternatively. One example method comprises operating the engine with one of the fuels on the basis of a driver's request, and in response to a determination of a cold engine operation, operating the engine with the non-hydrocarbon fuel for a specified period irrespective of the driver's request. If it is determined that an evaporated fuel is to be provided to the engine while the engine is operating with non-hydrocarbon fuel due the cold engine operation, then switching to operation with hydrocarbon fuel and thereafter providing evaporated fuel into the engine.

8 Claims, 7 Drawing Sheets

CONTROL METHOD AND SYSTEM FOR DUAL-FUEL ENGINE

FIELD OF THE INVENTION

The present description relates to a control method and system for a dual-fuel engine in which hydrocarbon liquid fuel such as gasoline or light diesel oil, etc., or non-hydrocarbon gas fuel such as hydrogen gas, etc., are selected alternatively as a fuel.

More, specifically, the present description relates to a control method and system for a dual-fuel engine when evaporation fuel gas is provided into the engine.

BACKGROUND AND SUMMARY

From an environmental concern standpoint, especially a carbon dioxide ($CO_2$) reduction standpoint, a dual-fuel engine has been developed, which can switch fuel between liquid fuel such as gasoline and a gas fuel such as hydrogen gas.

One example of such a dual-fuel engine is described in JP2007-162632.

In this reference, a control method for a dual-fuel engine in which the type of applied fuel is changed by a driver between gasoline (liquid fuel) and hydrogen gas (gas fuel) is described. Specifically, when an amount of evaporated fuel trapped in a canister meets a predetermined condition such that a canister purge should be implemented, an air-fuel ratio of hydrogen gas provided into an engine is set to a leaner value than a stoichiometric ratio, and then the purge is implemented, which results in decreasing the torque increase that can be generated by a canister purge operation.

According to the methods described in this reference, because the operating mode is not changed forcibly from a hydrogen using mode to a gasoline using mode when the canister purge is implemented, torque fluctuations that accompany canister purge operations may be reduced, further, a torque increase of the engine due to the canister purge operation may be offset by a leaner air-fuel ratio.

Another example of a dual-fuel engine is described in JP2008-88864. In this reference, a control method for a dual-fuel engine in which applied fuel is changed by a driver between gasoline (liquid fuel) and hydrogen gas (gas fuel) is described. Specifically, a dual-fuel engine is described that uses hydrogen gas as a fuel when a catalyst provided in an exhaust system of the engine is not activated to have sufficient performance, as long as a remaining amount of hydrogen gas is not below a predetermined value. And after the catalyst is activated, when the predetermined condition is met, fuel switching is restricted such that gasoline is forcibly used as a fuel.

According to the method described in this reference, exhaust emission quality can be improved while the catalyst is not yet activated and hydrogen gas fuel that is required when the catalyst is not activated can be saved, by restricting usage of hydrogen gas fuel while using gasoline fuel positively after the catalyst is activated.

By using gas fuel with no carbon until the catalyst is activated during cold engine start as described in reference of JP2008-88864, emission quality can be improved in comparison with using hydrocarbon fuel.

However, the inventors herein have recognized that because there are various patterns depending on engine operating conditions and/or environmental factors for generating evaporated fuel in a gasoline tank, it is difficult to inhibit generation of evaporated fuel itself even if the driver can select fuel provided in an engine.

Even if a driver is environment-oriented and selects a gas fuel, when providing evaporated fuel, a so-called canister purge is implemented while the catalyst is not activated, and as a result, dissociation and purification of hydrocarbon may be implemented insufficiently, and therefore, non-purified exhaust gas would be undesirably exhausted into the atmosphere.

Especially, in the case that a driver selects a gas fuel, lean combustion with lean air-fuel ratio mostly occurs, and a temperature of exhaust gas may be below 300 degrees C. during lean operation with low crankshaft revolution speeds. In this case, the quantity of heat inputted into the catalyst becomes increasingly smaller, and therefore, there is a greater tendency to increase unpurified hydrocarbon.

The present description is made considering the above described issue and addresses a simultaneous pursuit of providing evaporated fuel during cold engine conditions and improvement of exhaust gas purification performance.

A first aspect of the present description includes a method for controlling a dual-fuel engine that has an evaporated gas providing device for providing an evaporated gas into the engine and is operable with non-hydrocarbon fuel or hydrocarbon fuel, alternatively, the method comprising: operating said engine with one of the fuels on the basis of a driver's request; in response to the determination of a cold engine operation, operating said engine with non-hydrocarbon fuel for a specified period irrespective of a driver's request; determining that an evaporated fuel is to be provided into said engine; and if it is determined that the evaporated fuel is to be provided into said engine when the engine is operating with non-hydrocarbon fuel due to the determination of the cold engine conditions, then switching to operation with hydrocarbon fuel and thereafter providing evaporated fuel into the engine.

This method overcomes at least some of the disadvantages of the above related art.

Specifically, this control method operates the engine with non-hydrocarbon fuel for a specific period irrespective of a driver's request during cold operation. Further, in the case that providing evaporated fuel is requested during operation with non-hydrocarbon fuel, by switching to hydrocarbon fuel operation before providing the evaporated fuel, heat is provided to the catalyst.

Thus, by operating the engine with non-hydrocarbon fuel for a specific period irrespective of a driver's request during the cold engine conditions, an amount of exhaust gas requiring purification is reduced or minimized.

Further, when providing evaporated fuel is requested, by operating the engine with hydrocarbon fuel having higher heat value, it becomes possible to operate the engine with a minimum amount of hydrocarbon fuel and to restrict generation of hydrocarbons due to providing evaporated fuel.

In one embodiment, the method may further comprise determining if there was an engine operation at a predetermined high power level before the request for providing evaporated fuel was received during engine operation with non-hydrocarbon fuel, and providing evaporated fuel without switching to operation with hydrocarbon fuel when it is determined that there was an engine operation making the predetermined high power level.

According to this method, because there is a step of providing evaporated fuel without switching to operation with hydrocarbon fuel in the case that there was an engine operation making predetermined high power level during engine operation with non-hydrocarbon fuel, a time period from the generation of the evaporated fuel providing request to implement providing evaporated fuel can be shortened.

In another embodiment, the method may further comprise increasing engine output with non-hydrocarbon fuel for a predetermined period before switching fuel from non-hydrocarbon fuel to hydrocarbon fuel.

According to this embodiment, because the method has a step of increasing engine output with non-hydrocarbon fuel for a predetermined period before switching fuel from non-hydrocarbon fuel to hydrocarbon fuel, hydrocarbon purifying performance just after switching engine operation to use non-hydrocarbon fuel may be improved.

As one example of this embodiment, said dual-fuel engine has a battery charged by the engine and is provided in a hybrid system where a motor powers the vehicle and said dual-fuel engine is operated to generate electricity provided to the motor such that the engine may generate electricity by increasing engine output in the said step of increasing engine output with non-hydrocarbon fuel for a predetermined period. The method may further comprise a step of charging said battery via electricity generated by the engine.

According to this example, because the method has steps of generating electricity by increasing engine output and charging the battery using generated electricity, the method makes possible the simultaneous pursuit of inhibiting torque shock due to output increase and charging the battery in the hybrid system.

A second aspect of the present description includes a system for controlling a dual-fuel engine that is alternatively operable with non-hydrocarbon fuel or hydrocarbon fuel, the system comprising an evaporated gas providing device for providing an evaporated gas into said engine; a device for determining a cold engine operation; a fuel change device that causes a change in fuel type used in the engine depending on a driver's selecting operation; and a controller for controlling said evaporated gas providing device and fuel providing devices, wherein said controller is configured to: operate said engine with non-hydrocarbon fuel for a predetermined period irrespective of operation of said fuel change device when the cold engine operation is determined; determine that an evaporated fuel is to be provided into said engine; and switch to operation with hydrocarbon fuel and thereafter provide evaporated fuel into the engine when providing evaporated fuel into the engine is requested during engine operation with non-hydrocarbon fuel.

This system overcomes at least some of the disadvantages of above references in the same manner as the first aspect of the present description described above.

In one embodiment, said controller is further configured to determine that there was an engine operation making a predetermined high power level before a request was received to provide evaporated fuel during engine operation with non-hydrocarbon fuel, and provide evaporated fuel without switching to operation with hydrocarbon fuel when it is determined that there was an engine operation making the predetermined high power level.

According to this embodiment, because evaporated fuel is provided to the engine without switching to operation with hydrocarbon fuel in the case that there was an engine operation making the predetermined high power level during engine operation with non-hydrocarbon fuel, the time period from the generation of the evaporated fuel providing request to implementation of providing evaporated fuel can be shortened.

In another embodiment, said controller is further configured to increase engine output with non-hydrocarbon fuel for a predetermined period before switching fuel from non-hydrocarbon fuel to hydrocarbon fuel.

According to this embodiment, because the controller is further configured to increase engine output with non-hydrocarbon fuel for the predetermined period before switching fuel from non-hydrocarbon fuel to hydrocarbon fuel, hydrocarbon purifying performance just after switching engine operation to use non-hydrocarbon fuel may be improved.

As one example of this embodiment, said dual-fuel engine has a battery charged by said engine and is provided in a hybrid system where a motor powers a vehicle and said dual-fuel engine is operated to generate electricity provided to the motor such that said engine may generate electricity by increasing engine output when said controller increases engine output with non-hydrocarbon fuel for a predetermined period, wherein said controller is further configured to control said battery so that it charges via electricity generated by said engine.

According to this example, because the engine generates electricity by an increase in engine output and said battery is charged by generated electricity, the system makes possible the simultaneous pursuit of inhibiting torque shock due to output increase and battery charging in the hybrid system.

The above advantages and other advantages and features of the present description will be readily apparent from the following Detailed Description when taken alone or in connection with the accompanying drawings.

DETAIL DESCRIPTION

Figure 2:
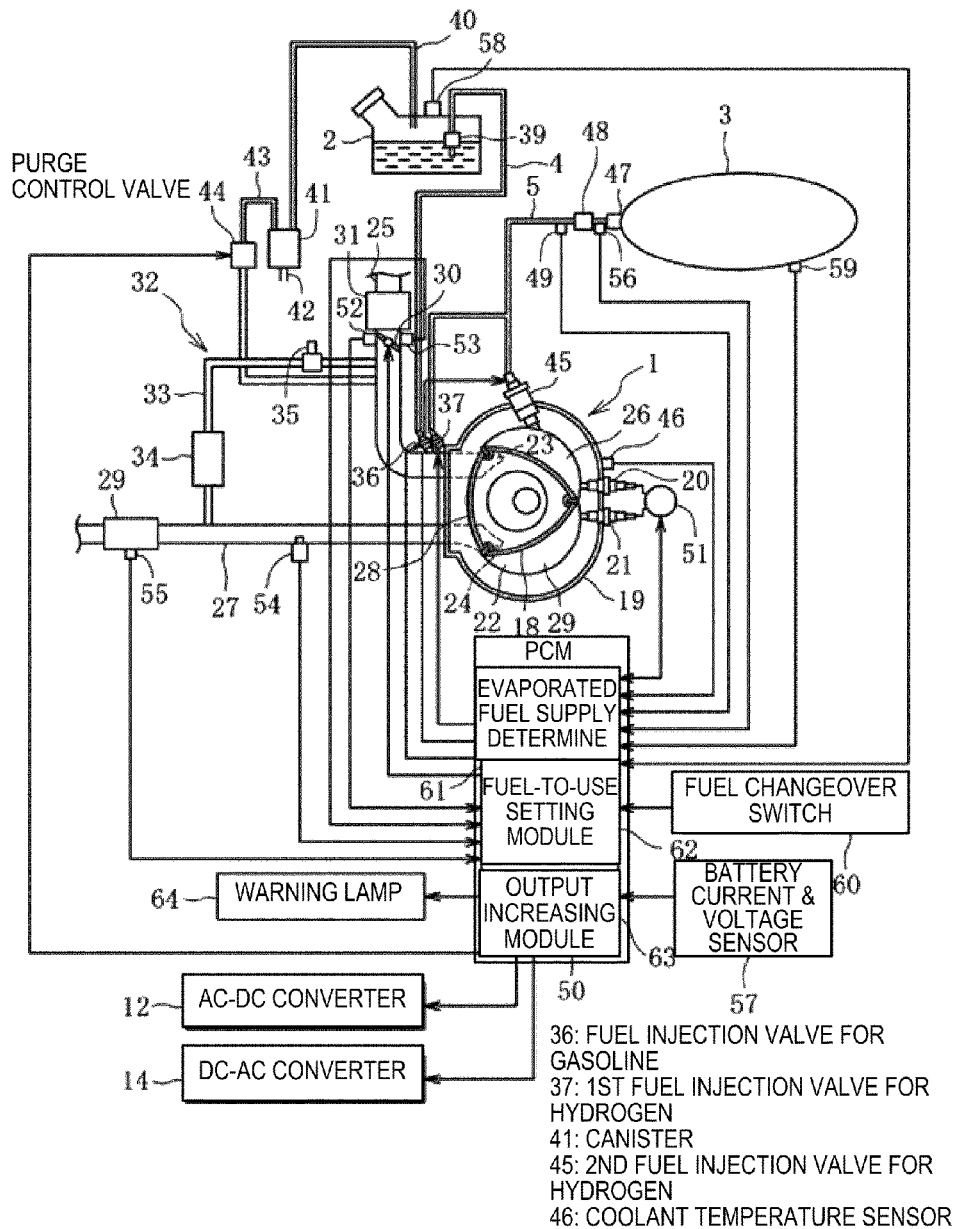
FIG. 2 is a control block diagram of the engine.
Figure 3:
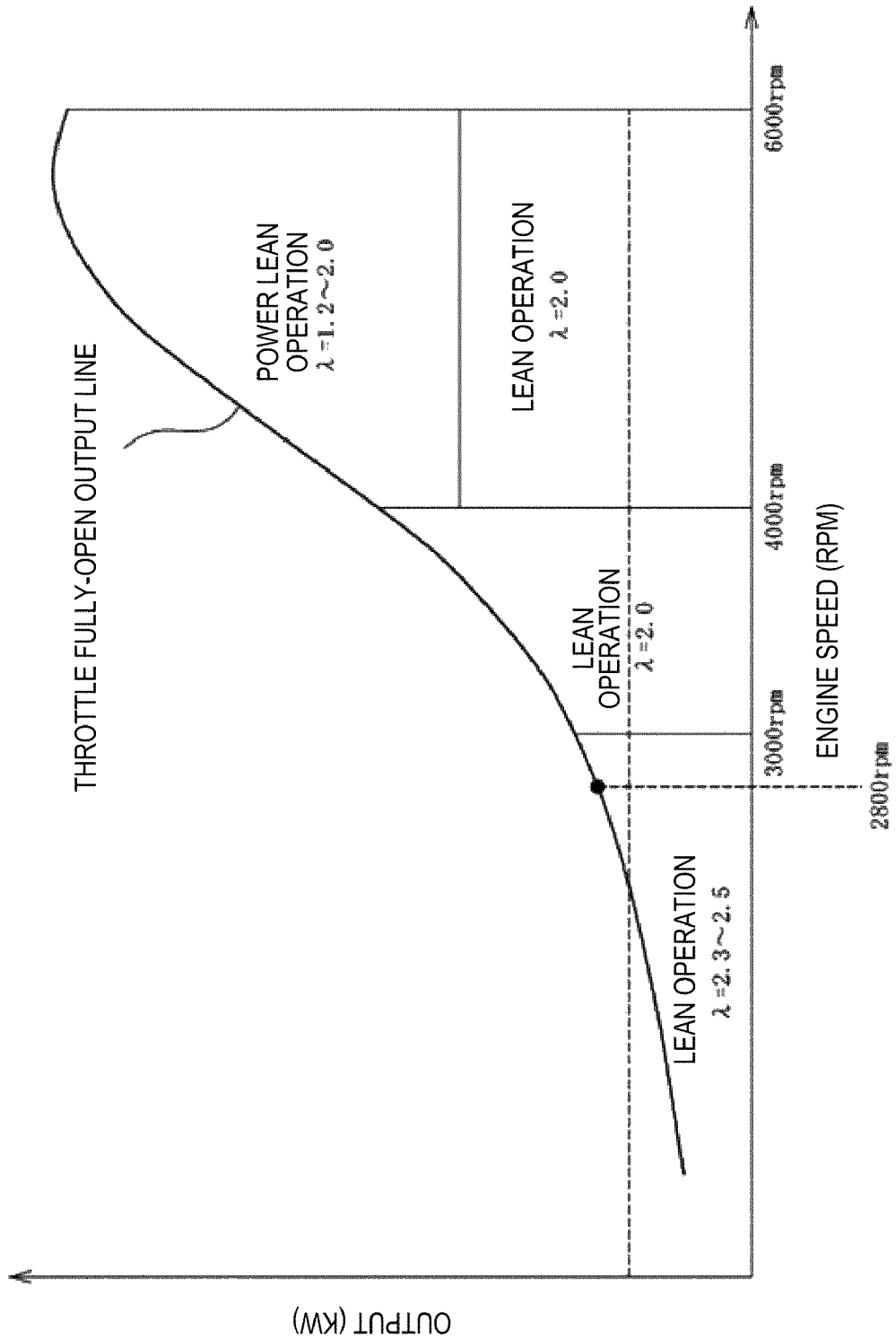
FIG. 3 is a map of target operating modes at the time of selecting a hydrogen fuel in the engine.
Figure 4:
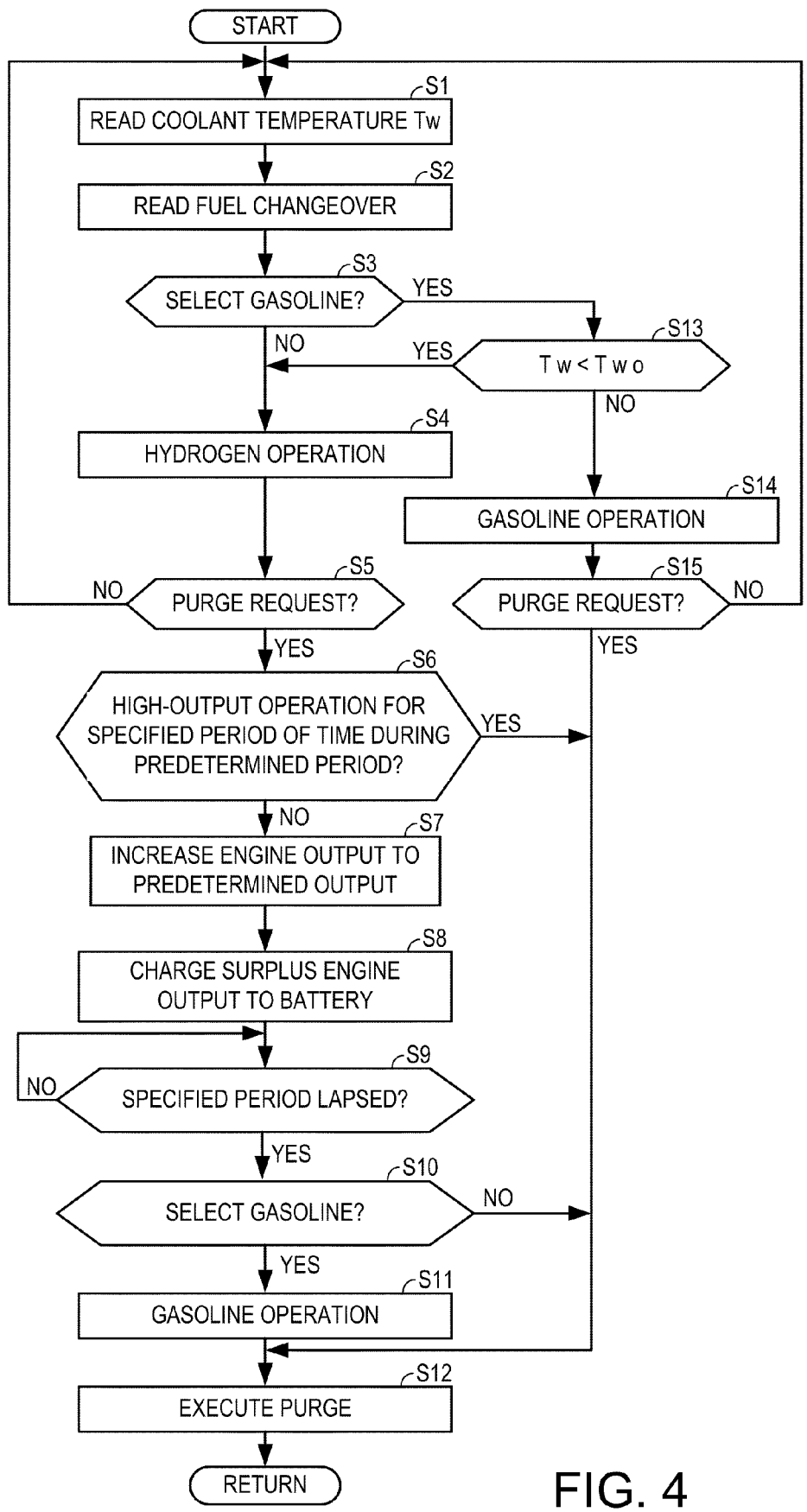
FIG. 4 is a flowchart showing a purge control of an evaporated fuel according to this embodiment.
Figure 5:
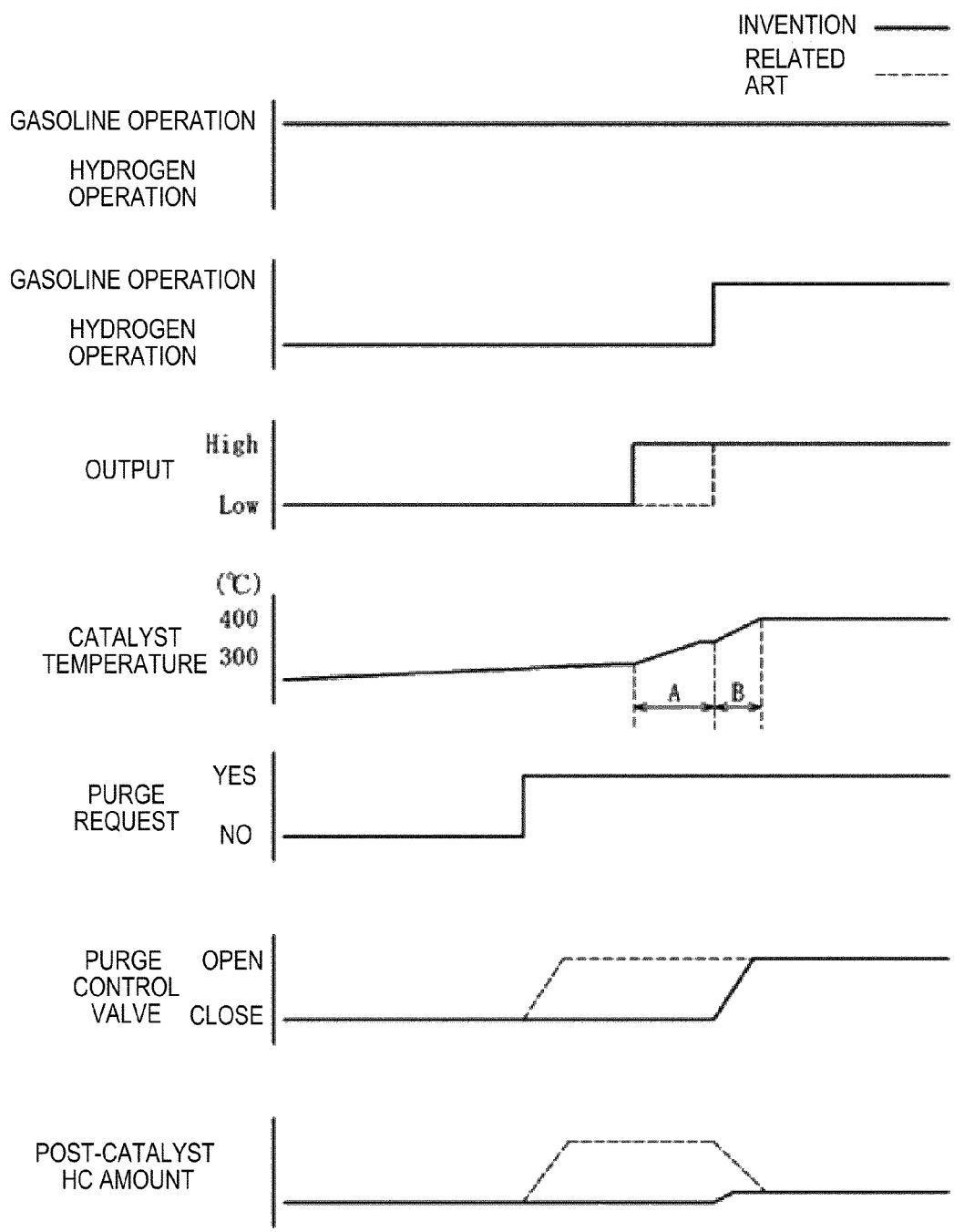
FIG. 5 is a timing chart of the purge control according to this embodiment.

Hereinafter, embodiments of the invention will be described based on the drawings.
Embodiment 1
—Drive System Configuration—
FIG. 1 is an entire view of a drive system of a vehicle equipped with a dual-fuel engine according to Embodiment 1 of the invention, FIG. 2 is a control block diagram of the dual-fuel engine, FIG. 3 is a map of target operating modes at the time of selecting a hydrogen fuel, FIG. 4 is a flowchart indicating a purge control of an evaporated fuel, and FIG. 5 is a timing chart of the control.

The vehicle of this embodiment has a hybrid system equipped with a dual-fuel engine which is selectively operable by a gasoline fuel (hydrocarbon fuel) or a hydrogen fuel (non-hydrocarbon fuel). The vehicle of this embodiment is not driven by transmitting a driving force of the dual-fuel engine directly to an axle of the vehicle. Rather, in the vehicle of this embodiment, the dual-fuel engine generates electrical power to be supplied to a motor to drive the vehicle. In other words, the vehicle of this embodiment has a hybrid system equipped with the dual-fuel engine.

Figure 1:
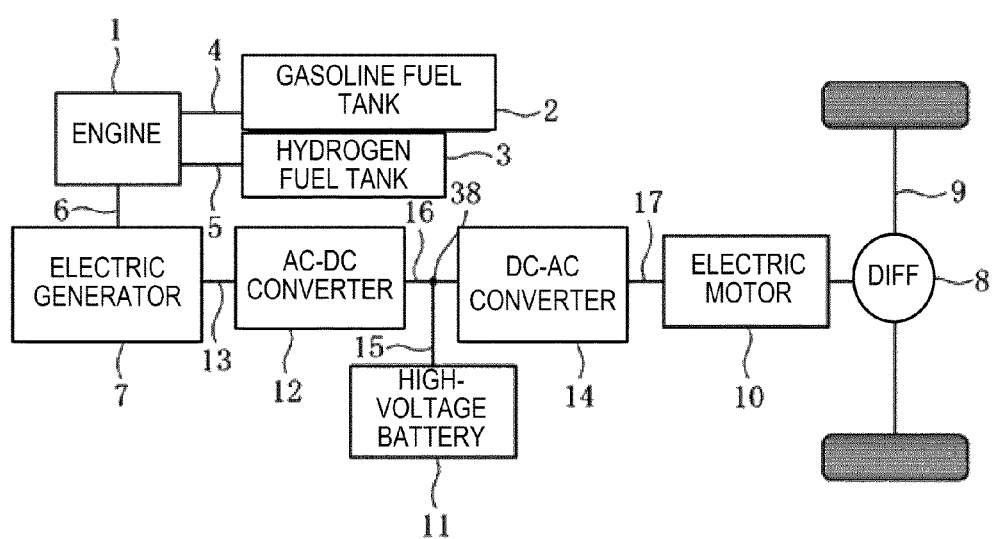
FIG. 1 is an entire view of a drive system of a vehicle equipped with a dual-fuel engine according to Embodiment 1 of the present invention.

The drive system of the vehicle in this embodiment, as shown in FIG. 1, includes an engine 1 having a two-rotor rotary engine, a gasoline fuel tank 2 and a hydrogen fuel tank 3, a gasoline supply passage 4 through which gasoline is supplied from the gasoline fuel tank 2 to the engine 1, and a hydrogen supply passage 5 through which hydrogen is supplied from the hydrogen fuel tank 3 to the engine 1. The drive system also includes a generator (electric generator) 7 that is driven by an output shaft 6 of the engine 1, a motor (electric motor) 10 that drives the axle 9 through a differential 8, a battery (high-voltage battery) 11 that is charged with electrical power for driving the motor 10, an AC-DC converter 12 for converting alternating current to direct current, a current pathway 13 to send alternating current to the AC-DC converter 12 to convert the alternating current generated in the generator 7 to direct current, a DC-AC converter 14 for converting direct current to alternating current, and a current pathway 15 to send direct current from the AC-DC converter 12 to the battery 11. Further, the drive system also includes a current pathway 16 separated from the current pathway 15 to send direct current from the AC-DC converter 12 and direct current from the battery 11 to the DC-AC converter 14, and a current pathway 17 to provide alternating current to the motor 10 from the DC-AC converter 14.

Installed in the current pathway 15 to send direct current from the AC-DC converter 12 to the battery 11, on the side of the battery 11 from the junction of the current pathway 16 towards the DC-AC converter 14, is a changeover switch 38 for switching between a position to send direct current from the AC-DC converter 12 to the battery 11 to charge the battery 11 and a position to supply direct current to the motor 10 through the DC-AC converter 14 without charging the battery 11.

A basic operation of the series hybrid vehicle is as follows. The engine 1 is not always in operation. When the engine 1 is in a start or a low-torque operating state, because a greater driving force of the engine 1 is not necessary, the engine 1 is made to be inoperative allowing the electrical power from the battery 11 to be supplied to the motor 10 through the DC-AC converter 14 to drive the vehicle.

Then, when the engine torque is increased and it reaches a middle torque operating state, electrical power from the battery 11 is consumed and the storage level of the battery 11 decreases. The generator 7 is then driven by the engine 1 and the electrical power generated from the generator 7 is supplied to the motor 10 to drive the vehicle.

When the engine torque is further increased and it reaches a high-torque operating state, the electrical power generated only by the engine 1 will be insufficient, the electrical power generated from the generator 7 being driven by the engine 1 and the electrical power stored in the battery 11 are both then supplied to the motor 10 to drive the vehicle.

The vehicle is also configured such that when the storage level of the battery 11 reduces to a level where it needs to be charged and the engine 1 is in a non-operational state, for example, in a state where the engine 1 is running at a low torque and the battery storage level reduces rapidly, the engine 1 is then started to charge the battery 11.

On the other hand, it is also configured such that when the storage level of the battery 11 reduces to a level where it needs to be charged and the engine 1 is already in an operational state, for example, in a state where the engine 1 is running at a high torque, the electrical power generated from the generator 7 and the electrical power stored in the battery 11 are both supplied to the motor 10 and the storage level of the battery 11 reduces rapidly, the vehicle then waits for the torque to become a middle torque state as well as the electrical power generated from the generator 7 is maintained at a high level to generate electrical power greater than necessary for the motor 10, and thereby charging the surplus electrical power to the battery 11.

—Engine Peripheral Configuration—

As shown in FIG. 2, two ignition plugs 20 and 21 are fitted in each of rotor housings 19 into which a rotor 18 is arranged (only one rotor housing and rotor are shown). In a side-housing 22, an intake port 23 and an exhaust port 24 are formed. An intake passage 25 is connected to the intake port 23 so that air is introduced to an operating chamber (combustion chamber) 26 through the intake passage 25. In addition, an exhaust passage 27 is connected to the exhaust port 24 so that exhaust gas inside the corresponding operating chamber (combustion chamber) 28 is discharged through the exhaust passage 27 after being purified by a catalyst 70 located downstream. The above-described configuration is similar for each of the rotors 18.

Each rotor 18 typically rotates clockwise in FIG. 2, and in the illustrated state, a compression stroke is carried out in one operating chamber (operating chamber 26) and an exhaust stroke is carried out in the other operating chamber (operating chamber 28), respectively.

The ignition plugs 20 and 21 are located at positions in series in the rotating direction of the rotors 18 and are arranged parallel to each other. A plug hole is formed in the rotor housing 19 for each of the ignition plugs 20 and 21.

When an apex seal of the rotor 18 passes the first ignition plug on the trailing side in the rotating direction of the rotor 18 (i.e., ignition plug 20), there is a large difference in pressure produced between the operating chamber 26 in a compression stroke and the operating chamber 29 in an expansion stroke, and it is easy for the gas to be leaked between the chambers. Therefore, the ignition plug 20 is placed at a position far away from the operating chamber being a combustion chamber.

On the other hand, when the apex seal of the rotor 18 passes the second ignition plug on the leading side in the rotating direction of the rotor 18 (i.e., ignition plug 21), there is a small difference in pressure produced between the operating chamber 26 in a compression stroke and the operating chamber 29 in an expansion stroke. Therefore, the ignition plug 21 is placed at a position closer to the operating chamber being a combustion chamber.

A throttle valve 30 is placed upstream in the intake passage 25, and an air cleaner 31 is placed further upstream of the throttle valve 30. An EGR device 32 that returns a part of exhaust gas in the exhaust passage 27 to the intake passage 25 is provided downstream in the exhaust passage 27. The EGR device 32 includes an EGR passage 33 that couples the exhaust passage 27 and the intake passage 25, an EGR cooler 34 that cools the exhaust gas returned through the EGR passage 33 to increase the concentration of the exhaust gas, and an EGR valve 35 that controls an EGR rate.

In proximity to the intake port 23, located furthest downstream in the intake passage 25, a fuel injection valve 36 for gasoline and a first fuel injection valve 37 for hydrogen are mounted. The fuel injection valve 36 allows the supply of an air-fuel mixture, which is gasoline injected as a liquid fuel from the intake port 23 mixed with air, to the operating chamber, which is a combustion chamber. The first fuel injection valve 37 allows the supply of an air-fuel mixture, which is hydrogen injected as a gaseous fuel from the intake port 23 mixed with air, to the operating chamber, which is a combustion chamber.

The gasoline fuel injection valve 36 is connected to the gasoline fuel tank 2 through the gasoline supply passage 4 through which gasoline is pumped from the gasoline fuel tank 2 by a gasoline pump 39. Further, an empty space inside the gasoline fuel tank 2 where gasoline is not stored is connected to a canister 41 through an evaporated fuel passage 40. Gasoline evaporated in the gasoline fuel tank 2 is introduced into the canister 41 through the evaporated fuel passage 40, and is adsorbed and trapped in the canister 41. The canister 41 has an air inlet 42 at a bottom portion thereof, and is made with a porous member filled with activated carbon, etc. Note that, inside the gasoline fuel tank 2, a non-illustrated remaining-gasoline sensor and a sensor for detecting an internal temperature of the gasoline fuel tank 2 are provided.

The canister 41 is connected to the intake passage 25 downstream of the throttle valve 30 through a purge passage 43, and a purge control valve 44 is arranged in the middle of the purge passage 43. The opening and closing of the purge control valve 44 is controlled electromagnetically, and when the valve is open (ON), the trapped evaporated fuel in the canister 41 is supplied (purged) to the intake passage 25.

Each of the rotor housings 19 is attached with a second, direct-fuel-injection-type fuel injection valve 45 for hydrogen that allows hydrogen to be used as a gaseous fuel to be directly injected into the operating chamber 26. The first fuel injection valve 37 and the second fuel injection valve 45 are connected to the hydrogen fuel tank 3 through the hydrogen supply passage 5 which is branched at the middle, and the hydrogen fuel is supplied to the engine 1 from the hydrogen fuel tank 3.

A stop valve 47 that controls discharge of hydrogen from the hydrogen fuel tank 3 to the hydrogen supply passage 5 is provided in the outlet of the hydrogen fuel tank 3. A cutoff valve 48 that controls a volume of hydrogen supplied to the first fuel injection valve 37 and the second fuel injection valve 45 is arranged in the hydrogen supply passage 5 downstream of the stop valve 47. Further, a pressure sensor 49 that detects a residual pressure inside the hydrogen supply passage 5 is provided in the passage downstream of the cutoff valve 48.

The fuel injection valves 36, 37, and 45 are connected to a computer (PCM) 50, which controls at least injection timings and injection volumes of the fuel injection valves 36, 37, and 45.

The PCM 50 is inputted with a coolant temperature detection signal from a coolant temperature sensor 46 that detects a coolant temperature of the engine 1, a hydrogen pressure detection signal from the pressure sensor 49, ignition signals from a distributor 51 connected to the ignition plugs 20 and 21, a throttle opening detection signal from a throttle opening sensor 52, an intake volume signal from an airflow sensor 53, an oxygen concentration signal from a linear $O_2$ sensor 54, a catalyst temperature detection signal from a catalyst temperature sensor 55 that detects a temperature of the catalyst 70, and a hydrogen flow rate detection signal from a hydrogen flow rate sensor 56.

Further, inputted to the PCM 50 are a current-and-voltage detection signal from a battery current-and-voltage sensor 57 that detects a current and a voltage of the battery 11, a gasoline tank internal pressure detection signal from a pressure sensor 58 that detects a pressure inside the gasoline fuel tank 2, a hydrogen tank internal pressure detection signal from a pressure sensor 59 that detects a pressure inside the hydrogen fuel tank 3, a fuel changeover signal from a fuel changeover switch 60 that is switchable depending on a user's selection of the fuel to be used, and an ambient air temperature detection signal from a non-illustrated ambient air temperature sensor.

Based on the signals described above, the PCM 50 controls the engine 1, controls the electrical power supplied to the motor 10 by controlling the AC-DC converter 12 and the DC-AC converter 14, and switches the power supply sources by controlling the changeover switch 38.

Further, the PCM 50 includes an evaporated fuel supply determination module 61 that determines the necessity of a purge when the engine 1 is in operation, a fuel-to-use setting module 62 that forcibly sets up a fuel to be used regardless of the selection of the fuel changeover switch 60, and an output increasing module 63 that corrects an engine output to increase it when the purge is requested while operating by the hydrogen fuel.

The evaporated fuel supply determination module 61 determines whether an amount of the trapped evaporated fuel adsorbed in the canister 41 exceeds a predetermined value or not based at least one of following methods. And when it is determined that the trapped amount exceeds a predetermined value, it determines that the purge is necessary.

(1) When the operation time during which the hydrogen fuel has been selected exceeds a predetermined duration time, the evaporated fuel supply determination module 61 determines that an amount of the trapped evaporated fuel adsorbed in the canister 41 exceeds a predetermined value.

(2) When the internal temperature or the internal pressure of the gasoline fuel tank 2 is above a predetermined value during which the hydrogen fuel has been selected, the evaporated fuel supply determination module 61 determines that an amount of the trapped evaporated fuel adsorbed in the canister 41 exceeds a predetermined value.

(3) A periodic interval set in advance so that the trapped evaporated fuel amount does not exceed a permissible level, the evaporated fuel supply determination module 61 determines that an amount of the trapped evaporated fuel adsorbed in the canister 41 exceeds a predetermined value.

Particularly, the execution of a purge during which the gasoline fuel has been selected requires the establishment of the following conditions (4) to (5).

(4) The engine coolant temperature is above a predetermined value (60 degrees C.).

(5) In an air-fuel ratio feedback control.

Note that, for the conditions (4) to (5), the determination may be made based on only one of or all of the conditions.

The fuel-to-use setting module 62 sets a predetermined fuel to use regardless of the user's selection of the fuel changeover switch 60. The setting module 62 is configured to forcibly set the fuel to use to hydrogen, at the time of starting the engine when the engine coolant temperature detected by the coolant temperature sensor 46 is below the predetermined value and thus determined to be a cold start, until the predetermined conditions are established even after the driver has selected the gasoline fuel using the fuel changeover switch 60, for example, until the engine completes warm-up.

The output increasing module 63 has a first function of executing an operation using the gasoline fuel before the execution of purge when the evaporated fuel supply determination module 61 determines the execution of purge is necessary, and a second function of increasing the engine output at the time of using the hydrogen fuel for a specified period of time when switching over from the hydrogen fuel to the gasoline fuel.

Further, the output increasing module 63 has a third function of activating the changeover switch 38 to preferentially charge the battery 11 with the electrical power generated based on an increase in the engine output. Further, when the engine torque is high, the motor 10 is driven both by the battery power and the electrical power generated by the engine 1. The output increasing module 63 also has a fourth function for this condition, in which the motor 10 is supplied with the electrical power generated by the engine 1 which is inclusive of a part of electrical power due to the output increase, while the battery 11 supplies the motor 10 with the electrical power which is deducted by the electrical power due to the output increase from the initially scheduled electrical power supply of the battery 11.

As described above, the engine 1 is configured such that the fuel to use is selectable by the driver operating the fuel changeover switch 60. If there is no selection of the fuel to use by the driver, hydrogen will be automatically used until the catalyst 29 is activated at an engine start.

As shown in FIG. 3, when the hydrogen fuel has been selected, the engine 1 is controlled based on a map for target operating modes. In this map, the horizontal axis indicates an engine speed, and the vertical axis indicates an engine output.

The engine 1 is configured to perform a combustion with an air-fuel ratio for a power lean operation at a high-speed and high-output range ($\lambda$=1.2 to 2.0), a lean combustion with an air-fuel ratio where a $NO_x$ emission amount approaches approximately zero at a high-speed and low-output or a middle speed range ($\lambda$=2.0), and a lean combustion with an air-fuel ratio where a $NO_x$ emission amount further approaches approximately zero at a low-speed range ($\lambda$=2.3 to 2.5).

Normally, the entire speed range is set so that the throttle valve 30 is controlled with a fully-open output line illustrated by a curved line as a target. However, an air-fuel ratio is set even in a range below the fully-open output line in the map, considering the engine speed is increased in a predetermined operating state, for example, at the time of acceleration, until a high engine speed is achieved at a low engine output state, to shift transmission gears.

The drive system is also configured such that when a selected fuel runs out while it is in use, it provides a warning to the driver by a warning lamp 64 installed in an instrument panel of the vehicle, and automatically switches to the other fuel. Note that the fuel in use typically is displayed on a display module in the instrument panel.

—Purge Control—

Hereinafter, a purge control by the PCM 50 will be described referring to a flowchart in FIG. 4. Note that Si (here, i=1, 2, . . . ) in the flowchart indicates each step of this control.

First, after an ignition switch (not shown) is turned ON, the PCM 50 reads out a current coolant temperature Tw signal of the engine 1 (S1) and a fuel changeover signal (S2), and in the next step S3, it determines whether the driver has selected the gasoline fuel. As a result of the determination of step S3, if the driver has selected the gasoline fuel, the coolant temperature Tw is compared to a reference coolant temperature Tw0 (for example, 15 degree C.) to determine the engine 1 to be in a cold start (S13).

As a result of the determination of step S13, if the coolant temperature Tw exceeds the reference coolant temperature Tw0, the PCM 50 carries out an operation using the gasoline fuel as selected by the driver (S14), and proceeds to step S15.

As a result of the determination of step S15, if there is no purge request, the PCM 50 returns to the start. On the other hand, if there is a purge request, the PCM 50 causes the purge control valve 44 to open to execute the purge (S12), and then returns the process. Note that, as described previously, the conditions for the purge request in step S15 are such that the internal pressure of the gasoline tank detected by the gasoline tank pressure sensor 58 is greater than a predetermined value, the engine coolant temperature is greater than a predetermined value, and the air-fuel ratio feedback is in execution.

As a result of the determination of step S13, if the coolant temperature Tw is below the reference coolant temperature Tw0, even though the driver has selected the operation using the gasoline fuel, because the engine 1 is in a cold start, the fuel-to-use setting module 62 forcibly sets to the hydrogen fuel operation (S4). Note that, as a result of the determination of step S3, when the driver has selected the operation using the hydrogen fuel, the PCM 50 also proceeds to step S4 to execute the hydrogen fuel operation.

After starting the execution of the hydrogen fuel operation, the PCM 50 then determines whether a purge is necessary (S5), and if there is no purge request, the PCM 50 returns to the start. On the other hand, if there is a purge request, the PCM 50 proceeds to step S6.

As a result of the determination of step S6, when the engine 1 has been operated at a high output over a specified period of time in the past, because the purification performance of the catalyst is increased by an amount of heat inputted from the engine, the PCM 50 executes a purge (S12) while continuing the operation using the hydrogen fuel, and then returns the process. Here, the high output operation over the specified period of time means that a cumulative time in which the engine 1 has exceeded a predetermined high engine speed has exceeded a specified period of time after the ignition switch (not shown) is turned ON. Note that the specified period of time is set in advance for each vehicle by considering a relationship between an activation temperature of the catalyst 29 and operating conditions of the engine 1 (load, engine speed, etc.). Further, the determination may also be based on a duration of time during which the predetermined high engine speed has continued the longest instead of based on the cumulative time.

As a result of the determination of step S6, when a high output operation has not been performed for more than the specified period of time in the past, the PCM 50 increases the engine output in the hydrogen fuel operation to a predetermined output (for example, 2800 rpm) (S7). Note that a table for the engine output and the target engine speed is stored in advance in the ROM of the PCM 50.

Regarding the electrical power generated by the increase in the engine output in step S7, the extra output except for the amount of electrical power required to drive the motor 10 is charged to the battery 11 (S8) after operating the changeover switch 38. Further, if it is in the high torque operation in which the motor 10 is driven by both the electrical power from the battery 11 and the electrical power generated by the engine 1, the PCM 50 controls the switch 38 such that the amount of electrical power supplied from the battery 11 to the motor 10 is decreased by the electrical power increased by the output increasing module 63.

As a result of the determination of step S9, when the increase in the engine output exceeds the specified period of time in the hydrogen fuel operation, the PCM 50 determines whether the driver has selected the gasoline fuel (S10). Note that, in the determination of step S9, when the temperature detected by the catalyst temperature sensor 55 reaches the activation temperature during the specified period of time, the PCM 50 may immediately proceed to step S10.

If the determination in step S10 is NO, because the purification performance of the catalyst is improved by the increase in the engine output, the PCM 50 returns the process after purging (S12) while continuing the operation using the hydrogen fuel.

On the other hand, when the determination in step S10 is YES, because the driver has selected the gasoline fuel, the PCM 50 switches the fuel to gasoline by actuating the fuel-to-use setting module 62 (S11), and then returns after purging (S12). Note that the engine output in the gasoline fuel operation is set to a target engine speed similar to the engine speed at the time of the increase in the engine output while using the hydrogen fuel.

The operations and effects of the purge control according to this embodiment will be described based on a timing chart shown in FIG. 5. Note that, in the timing chart, the solid lines indicate courses of the purge control and the dashed lines indicate courses of the control of related art, and here, it is assumed that the driver has selected the gasoline fuel.

When the driver has selected the operation using the gasoline fuel beginning immediately after an engine start, in the example of related art, even if the engine is in a cold start and there is no rise in the catalyst temperature, the PCM 50 determines the purge conditions, and after the conditions are established, the PCM 50 immediately causes the purge control valve 44 to open as shown by the dashed line. At this time, the catalyst 29 is in the middle of an engine warm-up and, thus, hydrocarbons in the exhaust gas after being purified by passing through the catalyst will be discharged without being substantially removed.

On the other hand, in the case of this embodiment, if the PCM 50 determines a cold start, because the operation is carried out using the hydrogen fuel even though the driver has selected the gasoline fuel, emission at an initial engine start condition can be ensured. When there is a request for the supply of evaporated fuel, the operation is carried out by a hydrocarbon fuel which generates a large amount of heat in addition to the operation using a non-hydrocarbon fuel which has been carried out from before. Therefore, activation of the catalyst is possible by the operation using the smallest amount of hydrocarbon fuel, and thereby reducing HC generation due to the supply of evaporated fuel. Even if the PCM 50 detects a purging request, it determines whether there was a high output operation exceeding the specified period of time in the past and whether there is a rise in the catalyst temperature. When the rise in temperature reaches a state in which it is sufficient to demonstrate the purification function, it is possible to prevent HC emission because purging is carried out immediately.

When a high output operation was not performed for more than the specified period of time in the past, the catalyst is in a low-temperature state. Therefore, the PCM 50 increases the engine speed to the predetermined engine speed before a purge to increase the catalyst temperature. At this time, it is preferable for the engine speed to be set higher for a lower engine output at that point of time. Further, the surplus amount of generated electrical power by the increase in engine speed is used to charge the battery 11, and thereby prevents a fluctuation in the torque due to increase in engine speed.

As the engine speed increases, the catalyst temperature increases as shown in a time period A. Further, when the driver has selected the gasoline fuel, because the operation using the gasoline fuel starts, there is a greater rate of increase in the temperature as shown in a time period B. Particularly, during the operation using gasoline fuel, because the same engine speed as that of the increased engine speed using the hydrogen fuel is used as a target, a torque shock arising from changeover can be prevented.

As indicated by the solid line in FIG. 5, the purge control valve 44 is opened at the end of the time period A and, thus, HC is adsorbed by the catalyst and purified. During the time period B after the end of the time period A, because the operation using the gasoline fuel is started, the heat input to the catalyst will be much greater than when operated using the hydrogen fuel. Therefore, HC is purified more effectively.

Particularly, in the case of this embodiment, in ranges other than a high-speed and high-load range, because a lean combustion with an air-fuel ratio ($\lambda=2.0$ or $\lambda=2.3$ to 2.5) where $NO_x$ emission is nearly zero is performed, it is possible to achieve a superior emission performance for $NO_x$ and HC.

Embodiment 2

Figure 6:
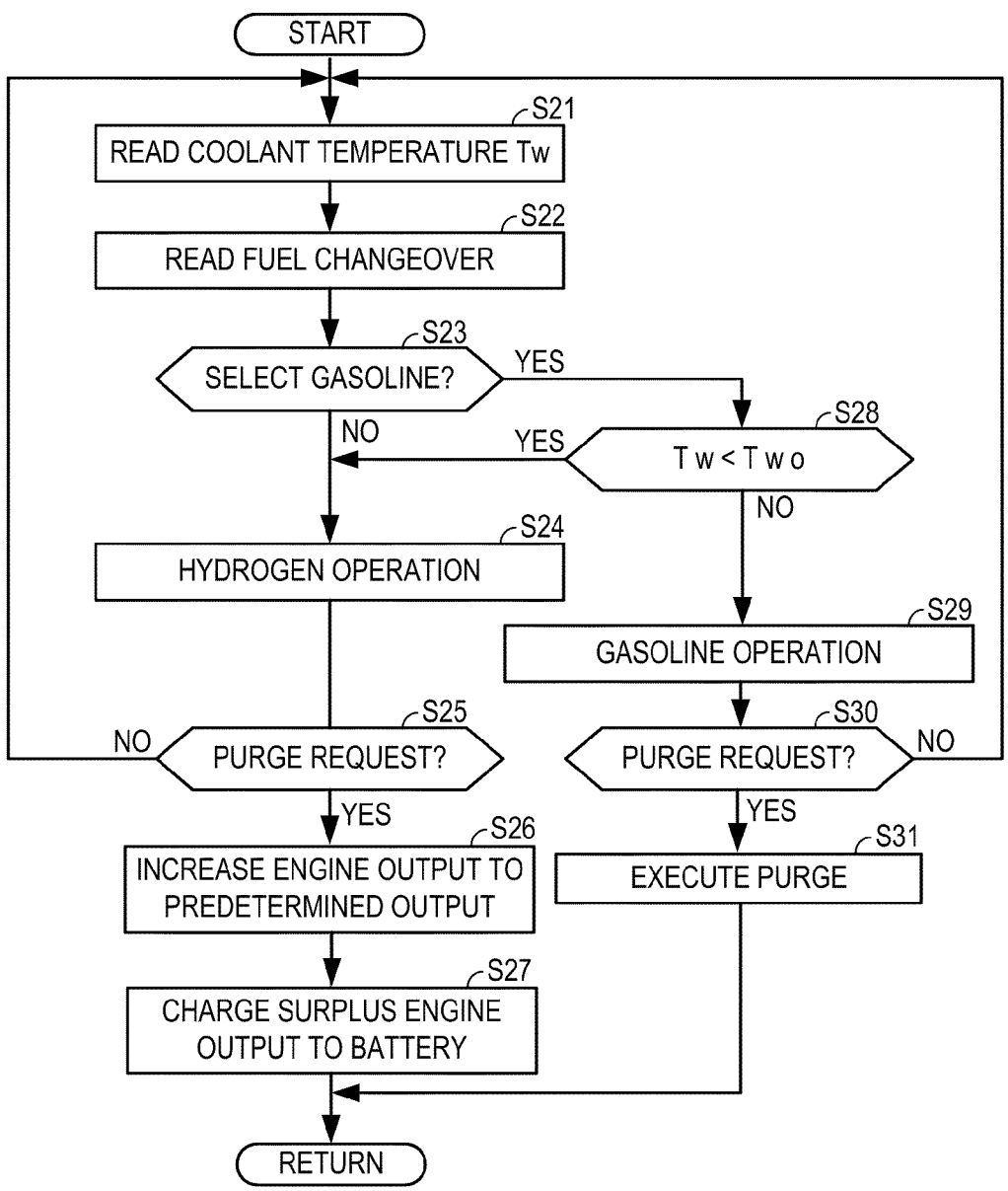
FIG. 6 is a flowchart showing a purge control of an evaporated fuel according to Embodiment 2 of the invention.

A purge control process according to another embodiment will be described based on a flowchart shown in FIG. 6. Note that a configuration of a control system and each of the functional components of this embodiment are similar to that of the previous embodiment.

In the previous embodiment, a purge is carried out if there is a purge request even when the driver selects the hydrogen fuel. On the other hand, in this embodiment, a purge will not be carried out until the driver selects the gasoline fuel.

First, after the ignition switch (not shown) is turned ON, the PCM 50 reads out a current coolant temperature Tw detection signal of the engine 1 (S21) and a fuel changeover signal (S22), and then determines whether the driver has selected the gasoline fuel (S23). As a result of the determination of step S23, if the driver has selected the gasoline fuel, the PCM 50 compares the engine coolant temperature Tw to a reference coolant temperature Tw0 for determining a cold start from the coolant temperature (S28).

As a result of the determination of step S28, if the coolant temperature Tw exceeds the reference coolant temperature Tw0, the PCM 50 carries out an operation using the gasoline fuel in accordance with the selection by the driver (S29), and then proceeds to step S30.

As a result of the determination of step S30, the PCM 50 returns to the start if there is no purge request. On the other hand, if there is a purge request, the PCM 50 executes a purge by opening the purge control valve 44 (S31), and then returns the process.

As a result of the determination of step S28, if the coolant temperature Tw is below the reference coolant temperature Tw0, even though the driver has selected the operation using the gasoline fuel, the operation is in a cold start. Thus, the fuel-to-use setting module 62 forcibly sets to the hydrogen fuel operation (S24). Note that, as a result of the determination of step S23, if the driver has selected the operation using the hydrogen fuel, the PCM 50 also proceeds to step S24 to execute the hydrogen fuel operation.

After starting the execution of the hydrogen fuel operation, the PCM 50 determines whether a purge is necessary (S25). If there is no purge request, the PCM 50 returns to the start. On the other hand, if there is a purge request, the PCM 50 proceeds to step S26.

In step S26, the engine output in the hydrogen fuel operation is increased to a predetermined output (for example, 2800 rpm). A table for the engine output and the target engine speed is stored in advance in the ROM of the PCM 50.

Regarding the electrical power generated by the output increase in step S26, the extra output except for the amount of electrical power required to drive the motor 10 is used to charge the battery 11 by operating the changeover switch 38 (S27), and the PCM 50 then returns. Note that, when the motor 10 drives at a high torque by both the electrical power from the battery 11 and the electrical power generated by the engine 1, similar to the previous embodiment, the PCM 50 controls the changeover switch 38 to deduct the amount of electrical power supplied from the battery 11 to the motor 10 by the amount of electrical power increased by the output increasing module 63.

Figure 7:
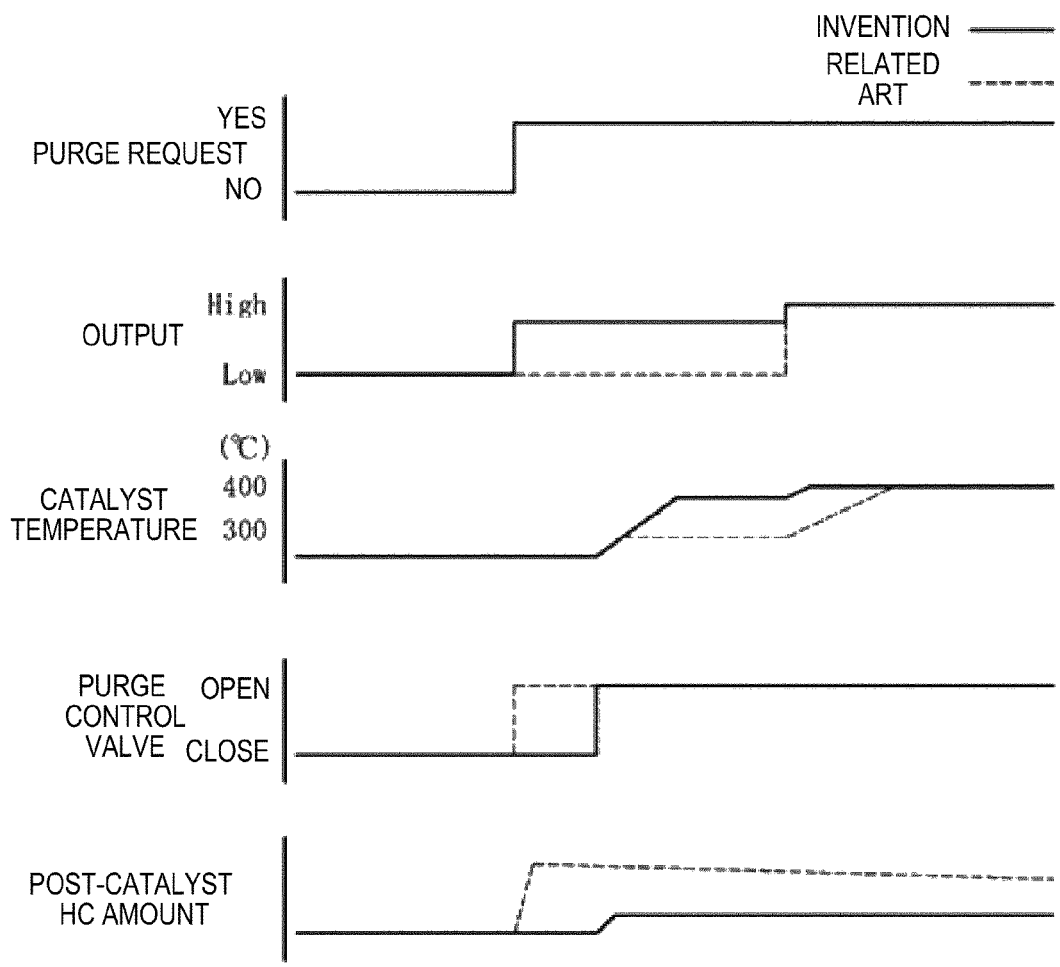
FIG. 7 is a timing chart of the purge control according to this embodiment.

The operations and effects of the purge control according to this embodiment will be described based on a timing chart shown in FIG. 7. Note that, in the timing chart, the solid lines indicate courses of the purge control and the dotted lines indicate courses of the control of related art.

Immediately after the engine is started and, thus, when the engine 1 is in a cold start and there is no rise in the catalyst temperature, the PCM 50 determines the purge conditions. When the conditions are established, the PCM 50 immediately opens the purge control valve 44 as shown by the dotted line. At this time, the catalyst 29 is in the middle of an increase in temperature and HC in the exhaust gas after being purified by passing through the catalyst is discharged without being substantially removed.

On the other hand, in the case for this embodiment, if a cold start is detected, the PCM 50 carries out the operation using the hydrogen fuel even though the driver has selected the gasoline fuel. Therefore, an initial emission performance at the engine start can be ensured, and if there is a request for the supply of evaporated fuel, the PCM 50 carries out the operation by a hydrocarbon fuel which generates a large amount of heat in addition to the operation using a non-hydrocarbon fuel which has been carried out from before. Thus, activation of the catalyst is possible by the operation using the least amount of hydrocarbon fuel, and thereby reducing the HC generation due to the supply of evaporated fuel.

Further, the operation using the hydrogen fuel can increase the catalyst temperature by increasing the engine speed to the predetermined engine speed. Further, the extra electrical power generated by the increase in engine speed is used to charge the battery 11, and thereby prevents a fluctuation in engine torque due to the increase in engine speed.

In the case of the hydrogen fuel operation, because there is a possibility of the catalyst to be at a low temperature, the engine speed is increased to the predetermined engine speed before a purge to increase the catalyst temperature. At this time, it is preferable for the engine speed to be set higher for a smaller engine output.

Further, the extra electrical power generated by the increase in engine speed is used to charge the battery 11, and thereby prevents a fluctuation in engine torque due to the increase in engine speed.

According to this embodiment, at the time of a cold start, if a purge request arises, it is possible to increase the catalyst temperature using the hydrogen fuel and charge the battery 11 at the same time. Further, even if the purge takes place immediately after a changeover to the gasoline fuel, because the catalyst temperature is sufficiently increased during a time period before the execution of a purge, it is possible to reduce HC emission. In addition, because the purge is carried out after the changeover to the gasoline operation which has a much greater heat inputted to the catalyst, it is possible to further reduce HC emission.

Other various modifications to the above described embodiments may be made without departing from the scope of the invention, and the present invention includes such modified embodiments.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A method for controlling a dual-fuel engine that has an evaporated gas providing device for providing an evaporated gas into the engine and is operable with non-hydrocarbon fuel or hydrocarbon fuel, alternatively, the method comprising:

operating said engine with one of the fuels based on a driver's request;
in response to a determination of a cold engine operation, operating said engine with non-hydrocarbon fuel for a specified period irrespective of a driver's request;
determining that an evaporated fuel is to be provided into said engine; and
if it is determined that the evaporated fuel is to be provided into said engine when the engine is operating with non-hydrocarbon fuel due to the determination of the cold engine conditions, then switching to operation with hydrocarbon fuel and thereafter providing evaporated fuel into the engine.

2. The method of claim 1 further comprising:
determining that there was an engine operation at a predetermined high power level before the request for providing evaporated fuel was received during engine operation with non-hydrocarbon fuel, and
providing evaporated fuel without switching to operation with hydrocarbon fuel when it is determined that there was an engine operation making the predetermined high power level.

3. The method of claim 1 further comprising:
increasing engine output with non-hydrocarbon fuel for a predetermined period before switching fuel from non-hydrocarbon fuel to hydrocarbon fuel.

4. The method of claim 1 wherein said dual-fuel engine has a battery charged by said engine and is provided into a hybrid system where a motor powers vehicle and said dual-fuel engine is operated to generate electricity provided to said motor such that said engine may generate electricity by increasing engine output in said step of increasing engine output with non-hydrocarbon fuel for the predetermined period, and the method further comprising charging electricity generated by the engine in said battery.

5. A system for controlling a dual-fuel engine that is alternatively operable with non-hydrocarbon fuel or hydrocarbon fuel, the system comprising
an evaporated gas providing device for providing an evaporated gas into said engine;
a device for determining a cold engine operation;
a fuel change device that causes a change in fuel type used in the engine depending on a driver's selecting operation; and
a controller for controlling said evaporated gas providing device and fuel providing devices, wherein said controller is configured to:
operate said engine with non-hydrocarbon fuel for a predetermined period irrespective of operation of said fuel change device when the cold engine operation is determined;
determine that an evaporated fuel is to be provided into said engine; and
switch to operation with hydrocarbon fuel and thereafter provide evaporated fuel into said engine when providing evaporated fuel into the engine is requested during engine operation with non-hydrocarbon fuel.

6. The system of claim 5 wherein said controller is further configured to determine that there was an engine operation making a predetermined high power level before a request was received to provide evaporated fuel during engine operation with non-hydrocarbon fuel, and provide evaporated fuel without switching to operation with hydrocarbon fuel when it is determined that there was an engine operation making the predetermined high power level.

7. The system of claim 5 wherein said controller is further configured to increase engine output with non-hydrocarbon fuel for a predetermined period before switching fuel from non-hydrocarbon fuel to hydrocarbon fuel.

8. The system of claim 7 wherein said dual-fuel engine has a battery charged by said engine and is provided into a hybrid system where a motor powers vehicle and said dual-fuel engine is operated to generate electricity provided to the motor such that said engine may generate electricity by increasing engine output when said controller increases engine output with non-hydrocarbon fuel for predetermined period, wherein said controller is further configured to control said battery so that it charges via electricity generated by said engine.

* * * * *